United States Patent [19]

Borkenhagen et al.

[11] Patent Number: 5,028,145
[45] Date of Patent: Jul. 2, 1991

[54] PROCESS AND APPARATUS FOR MEASURING THE TEMPERATURE OF THE PERIPHERAL SURFACE OF REVOLVING ROLL

[75] Inventors: Werner Borkenhagen, Krefeld; Lambert Berends, Goch, both of Fed. Rep. of Germany

[73] Assignee: Eduard Küsters Maschinenfabrik GmbH, Krefeld, Fed. Rep. of Germany

[21] Appl. No.: 403,684

[22] Filed: Sep. 5, 1989

[30] Foreign Application Priority Data

Sep. 2, 1988 [DE] Fed. Rep. of Germany ....... 3829862

[51] Int. Cl.$^5$ ................ G01K 1/14; G01K 13/08; G01K 13/04
[52] U.S. Cl. ..................... 374/153; 374/120; 374/121; 374/141; 100/38; 100/93 RP; 100/99; 432/60; 432/228
[58] Field of Search .......... 374/120, 121, 129, 137, 374/141, 153, 179; 250/338.1; 101/337; 432/59, 60, 227, 228; 136/230; 100/38, 93 RP, 99, 35

[56] References Cited

U.S. PATENT DOCUMENTS

| | | | |
|---|---|---|---|
| 3,965,973 | 6/1976 | Thettu et al. | 374/153 |
| 4,043,747 | 8/1977 | Ogiwara | 374/153 |
| 4,162,847 | 7/1979 | Brandon | 432/60 |
| 4,186,606 | 2/1980 | Tarumi et al. | 374/120 |
| 4,309,591 | 2/1982 | Kanoto et al. | 432/60 |
| 4,397,569 | 8/1983 | Davis | 374/137 |
| 4,877,331 | 10/1989 | Schrörs et al. | 374/121 |

FOREIGN PATENT DOCUMENTS

| | | | |
|---|---|---|---|
| 0029738 | 3/1978 | Japan | 432/60 |
| 0129656 | 11/1978 | Japan | 432/60 |

*Primary Examiner*—William A. Cuchlinski, Jr.
*Assistant Examiner*—Vinh Nguyen
*Attorney, Agent, or Firm*—Kenyon & Kenyon

[57] ABSTRACT

A temperature measuring arrangement for a revolving roll which includes a contactless temperature sensor by means of which the temperature of an annular peripheral zone of the roll situated outside the operating zone of the roll is measured contactlessly. Upon detection of a deviation from a given temperature or given time response of the temperature, a contact temperature sensor which is active only briefly is, by means of a control unit, brought into abutment, using a movement drive, at a point inside the operating zone of the roll.

6 Claims, 1 Drawing Sheet

PROCESS AND APPARATUS FOR MEASURING THE TEMPERATURE OF THE PERIPHERAL SURFACE OF REVOLVING ROLL

BACKGROUND OF THE INVENTION

This invention relates to revolving rolls in general, and, more particularly, to the measurement of the temperature of the peripheral surface of a revolving roll.

The exact measurement of the surface temperature of revolving rolls is still today a difficult technical problem. Especially for rolls which are used in the treatment of paper, plastic films, textile and nonwoven materials, it is sometimes vital to maintain temperatures with a deviation of less than 1 C. This deviation limit must be maintained both as regard to the absolute value and as to deviation from a mean value determined along a roll several meters long. An especially striking example is the compaction of nonwoven material made from thermoplastic synthetic fibers. Here the temperature must be such that during passage of the laid web through the roll nip the fibers are welded together just sufficiently for the web to hold together, but that, at the same time, the bond is limited to a certain degree so that the finished web remains rigid but does not become too boardy. For this, a very exact sensing and control of the temperature in dependence on the respective operating speed is essential.

The nexus of problems of exact temperature measurement on such rolls is connected with the fact, among others, that temperature sensors cannot be accommodated in the roll periphery. This would require bores in the peripheral surface resulting in an inhomogeneity of the peripheral surface. Such an inhomogeneity would be reflected in the roll surface and could lead to harmful stress concentrations and perturbations of the temperature distribution. Also, transmission of the measured values from the revolving roll to the outside would be costly.

In practice, therefore, only measurement at the roll periphery from the outside enters into consideration. For this purpus methods with contacting temperature sensors and contactless methods operating with radiation thermometers exist. The methods involving abutting contact of the temperature sensors are indeed very exact, because they can utilize heat conduction for the transmission to the sensor. They have the disadvantage, however, that in many cases they cannot be employed at any rate for a protracted temperature observation. Often, in fact, the rolls are precision machined on the surface according to the desired product quality, e.g., ground and polished. Such a surface would, due to the friction of a contacting fixed temperature sensor, show grinding traces after a short service period. These traces would then appear in the product, e.g., the paper web or plastic surface. Hence, this method is not acceptable. Contactless arrangements, i.e., those based on a radiation measurement, do not have this disadvantage, but they depend on the roll surface having a constant emission factor. But this, precisely, is often not the case in the operating zone of a roll, because adhering moisture and also tarnishing of the roll surface at higher operating temperatures cause variations of the emission factor. As a result, the measured radiation does not give a clear indication of the temperatures actually prevailing at the roll periphery.

Thus, there is a need to be able to reliably make an exact measurement of the temperature of the periphery of revolving rolls over a protracted service period.

SUMMARY OF THE INVENTION

This need is fulfilled by the present invention through a method in which, for measuring the temperature of the periphery of a revolving roll, the temperature of an annular peripheral zone of the roll situated outside the operating zone of the roll is contactlessly measured and, upon detection of a deviation from a given temperature or a given time response of the temperature, a contact temperature sensor is applied against the periphery of the roll at a point inside the operating zone.

The invention is based on the idea of carrying out the continuous control of the temperature contactlessly at a point situated outside the operating width, which therefore is not under the action of the web and which can be prepared with a view to an optimum emission factor. Here the temperature is monitored during the entire service period, without problems coming up with respect to frictional wear either at the working roll surface or at the temperature sensor.

In addition to the contactlessly measuring temperature sensor disposed outside the operating width at least one additional contact temperature sensor, which is provided within the operating width, is used. This sensor, however, is not continuously applied against the roll periphery; it makes contact only if the contactlessly measuring outer temperature sensor senses an anomaly, i.e., a deviation from a temperature constant existing until that time or a deviation from a given temperature response. Only in such a case of need is the contact temperature sensor applied against the roll periphery to determine, with the accuracy typical of it, the temperature in the zone of the contact point. Depending on the result of this measurement, the necessary counter-measures regarding the control of the temperature in the roll can be initiated. In this method, the contact temperature sensor is applied against the roll periphery only briefly. During this short time no serious wear of the roll surface or of the contact temperature sensor takes place.

By the combination of the two different temperature sensors at different points of the roll it is possible, therefore, to bring about a continuous temperature control with the precision typical of a contact temperature sensor but without its friction problems.

Generally, it will not be sufficient to determine the temperature only at one point of the operating zone. Instead, several measurement points will be necessary in order to pick up the entire temperature profile. This can be done by applying one and the same contact temperature sensor at several points of the operating zone successively or by applying several contact temperature sensors simultaneously at points distributed over the operating zone.

The present invention is also directed to apparatus for measuring the temperature of the periphery of a revolving roll. This apparatus includes a contactlessly operating temperature sensor aimed at an annular peripheral zone of the roll disposed outside the operating zone of the roll and having a constant emission factor, a contact temperature sensor normally supported at a distance from the periphery of the roll within the operating zone, a movement drive coupled to bring the contact temperature sensor into contact with the periphery of the roll when actuated, and a control unit receiving inputs from the contactless sensor and providing outputs to actuate the movement drive when the contactlessly operating temperature sensor indicates a deviation from a given temperature or from a given time response of the temperature. The movement drive can be capable of bringing the contact sensor into contact with different points or a plurality of contact temperature sensors can be provided.

The present invention resides in the combination of different temperature sensors arranged at different points of the roll and in their concerted action. Individual temperature sensors of the various kinds are known each by itself. Thus, for example, DE-OS1806637, shows a radiation thermometer which, as such, is contactless, but which is a component part of a contact temperature measuring arrangement for revolving rolls.

DETAILED DESCRIPTION

Figure 1:
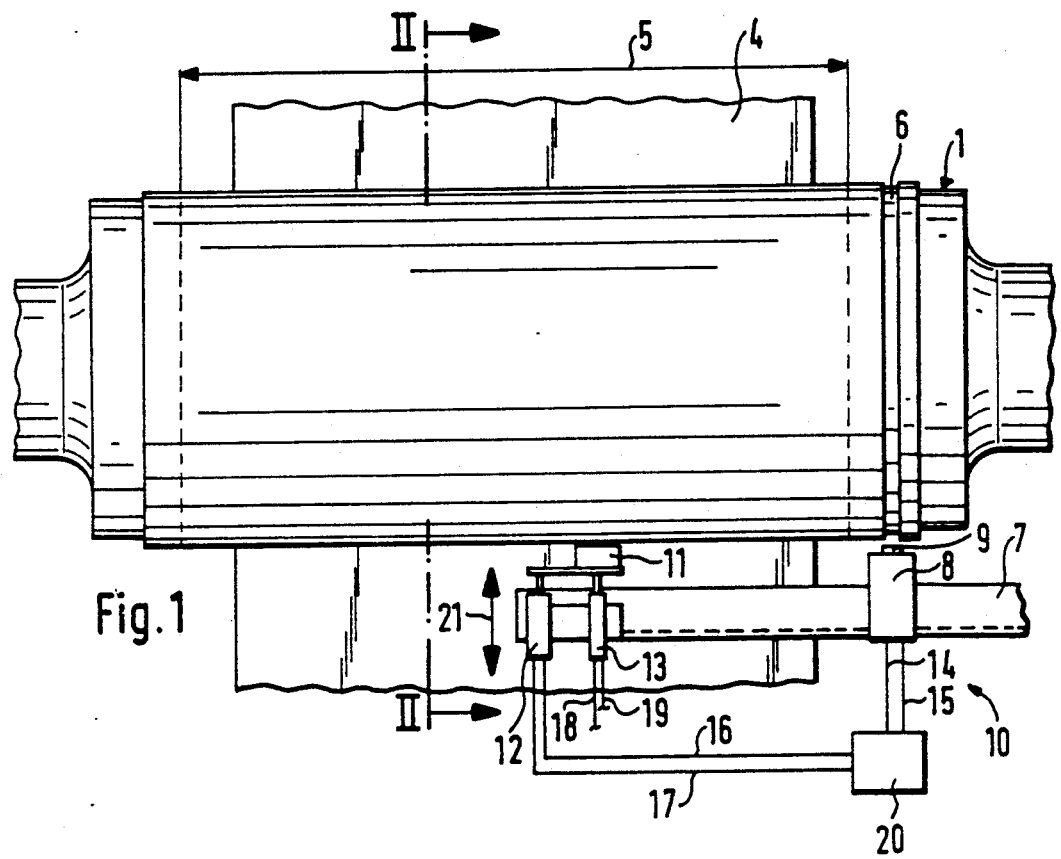
FIG. 1 is a plan view of a roll arrangement incorporating the present invention.

Illustrated in the FIGURES is a roll 1 which forms, with a bottom roll 2, a roll nip 3 for pressure treatment of a web 4. The roll 1 has an operating zone 5, the limits of which are shown in broken lines in FIG. 1. The web 4 lies entirely within the operating zone. In the illustrated embodiment a roll 1 with a metallic surface is involved. However, the invention can also be applied to rolls having a coating for example of plastic. Outside of the limit of the operating zone 5 to the right in FIG. 1, a slightly recessed annular peripheral zone 6 is provided which is prepared, e.g., blackened, so that, to the extent possible, its emission factor does not vary.

A temperature measuring arrangement 10 is provided which includes a support 7 extending parallel to the roll. A contactlessly measuring temperature sensor, in the form of a radiation thermometer 8, whose lens 9 is opposite the peripheral zone 6, and determines the temperature thereof by radiation measurement, is fastened to support 7.

Figure 2:
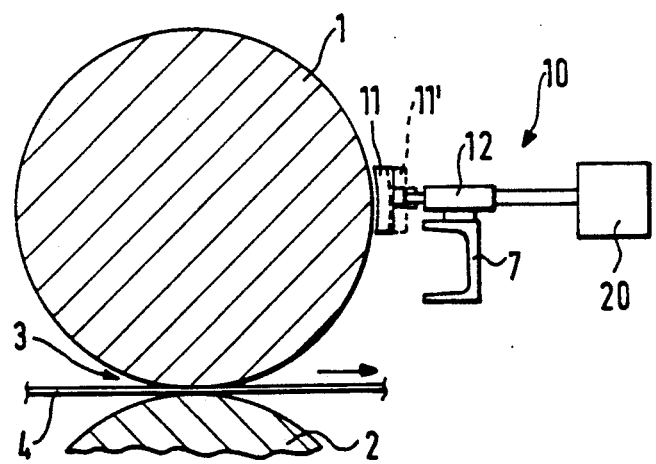
FIG. 2 is a section along line II—II of FIG. 1.

Inside the operating zone 5, a contact temperature sensor 11 is disposed on the support 7. Temperature sensor 11 can be moved by a drive 12 in the direction of arrow 21 from an abutting and measuring position illustrated in FIGS. 1 and 2 in solid lines into a retracted position, in which the contact temperature sensor 11 is held a certain distance from the periphery of roll 1, and which in FIG. 2 is indicated in broken lines and marked 11,. The contact temperature sensor 11 is movable along a guide marked 13 in FIG. 1 in a direction substantially radial to roll 1. The movement drive 12 may be designed in various ways, e.g., as an electromagnet, as a pneumatic cylinder, or the like.

The measurement signal of the contactless temperature sensor 8 is supplied via the lines 14 and 15 to a control unit 20, the output signal of which is sent via the lines 16 and 17 to the movement drive 12.

The control unit 20 is of such design that it actuates the movement drive 12 only in case of an irregularity of the temperature in the peripheral zone 6. Therefore, only when the temperature in the peripheral zone 6 begins to deviate from a previously constant value, or when a given temperature response, for example, a time-proportional temperature increase, is not maintained, does the control unit 20 deliver an actuating signal, for example, a voltage for actuation of an electromagnetic movement drive 12 or a pneumatic pressure for actuation of a pneumatic piston.

Upon actuation of the movement drive 12, the contact temperature sensor 11 is advanced from the normal position shown in broken lines in FIG. 2, in which it does not make contact on the periphery of the roll 1, to abutment on the periphery. When in abutment, it carries out a measurement whose signal appears on the lines 18 and 19 (FIG. 1). This signal can then be used to control a temperature regulating system not shown.

Instead of providing only one contact temperature sensor 11, several contact temperature sensors 11 distributed over the operating width 5 may be provided. An alternative possibility is that the control unit 20, upon activation, brings a single contact temperature sensor to abutment on the periphery of roll 1 successively at several points of the operating zone 5, thus permitting the determination of a temperature profile along roll 1.

Tests have shown that with the temperature measuring arrangement according to the present invention temperature inside the operating zone 5 can be determined reproducibly with an accuracy of ±0.2° C.

What is claimed is:

1. A method for measuring the temperature of the periphery of a revolving roll comprising contactlessly measuring the temperature of an annular peripheral zone of the roll situated outside the operating zone of the roll and, upon detection of a deviation from a given temperature or a given time response of the temperature, applying a contact temperature sensor against the periphery of the roll at a point inside the operating zone.

2. The method according to claim 1 and further comprising applying said contact temperature sensor against the periphery of the roll successively at several points distributed over the operating width.

3. The method according to claim 1, and further comprising applying several contact temperature sensors against the periphery of the roll simultaneously at several points distributed over the operating zone.

4. A temperature measuring arrangement for measuring the temperature of the periphery of a revolving roll comprising:
   (a) a contactlessly operating temperature sensor aimed at an annular peripheral zone of the roll disposed outside the operating zone of the roll and having a constant emission factor;
   (b) a contact temperature sensor normally supported at a distance from the periphery of the roll within the operating zone;
   (c) a movement drive coupled to bring said contact temperature sensor into contact with the periphery of the roll when actuated; and
   (d) a control unit receiving inputs from said contactless sensor and providing outputs to actuate said movement drive when said contactlessly operating temperature sensor indicates a deviation from a given temperature or from a given time response of the temperature.

5. A temperature measuring arrangement according to claim 4, wherein said movement drive further includes means for bringing said contact temperature sensor successively into abutment at the periphery of the roll at several points distributed over the operating zone.

6. A temperature measuring arrangement according to claim 4, wherein said temperature measuring arrangement comprises a plurally of contact temperature sensors each supported to be brought into abutment with the periphery of the roll simultaneously at points distributed over the operating width.

* * * * *

UNITED STATES PATENT AND TRADEMARK OFFICE
CERTIFICATE OF CORRECTION

PATENT NO. 5,028,145

DATED : July 2, 1991

INVENTOR(S) : Werner Borkenhagen

It is certified that error appears in the above-identified patent and that said Letters Patent is hereby corrected as shown below:

Column 3, line 48-49 should read --which in FIG. 2 is indicated in broken lines and marked 11'.--

Signed and Sealed this

Twenty-second Day of December, 1992

Attest:

DOUGLAS B. COMER

Attesting Officer

Acting Commissioner of Patents and Trademarks